(No Model.) 2 Sheets—Sheet 1.
J. T. CLAYTON.
WATER WHEEL.
No. 460,948. Patented Oct. 13, 1891.
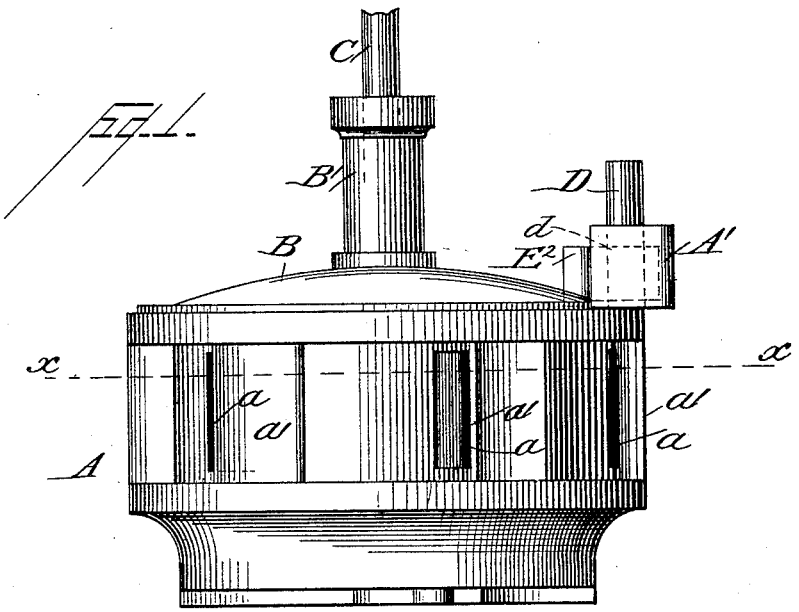
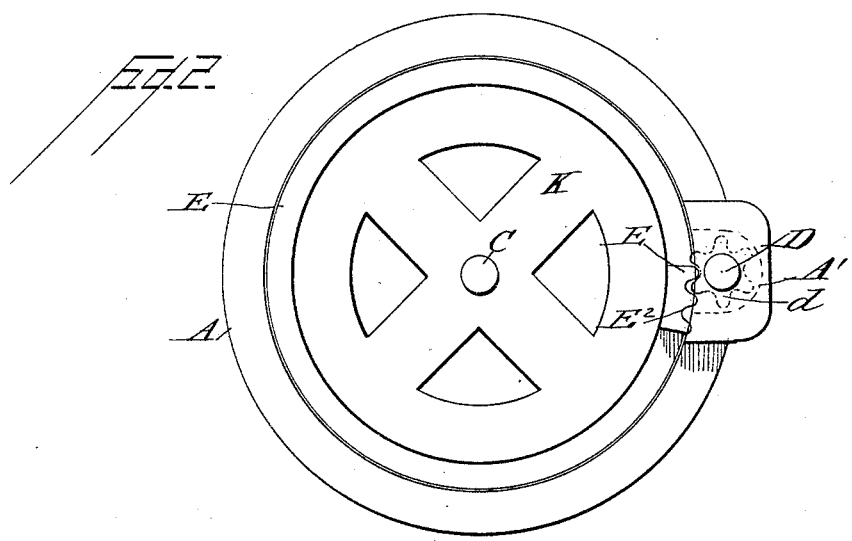
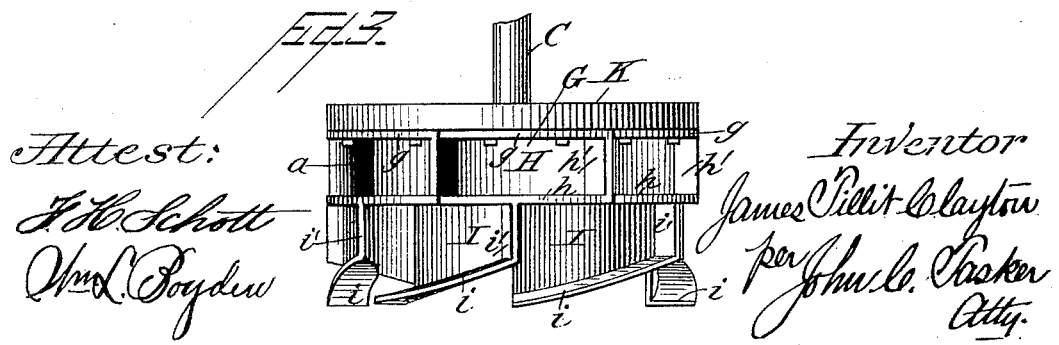
Attest:
F. H. Schott
Wm L. Boyden
Inventor
James Tillit Clayton
per John C. Tasker
Atty.

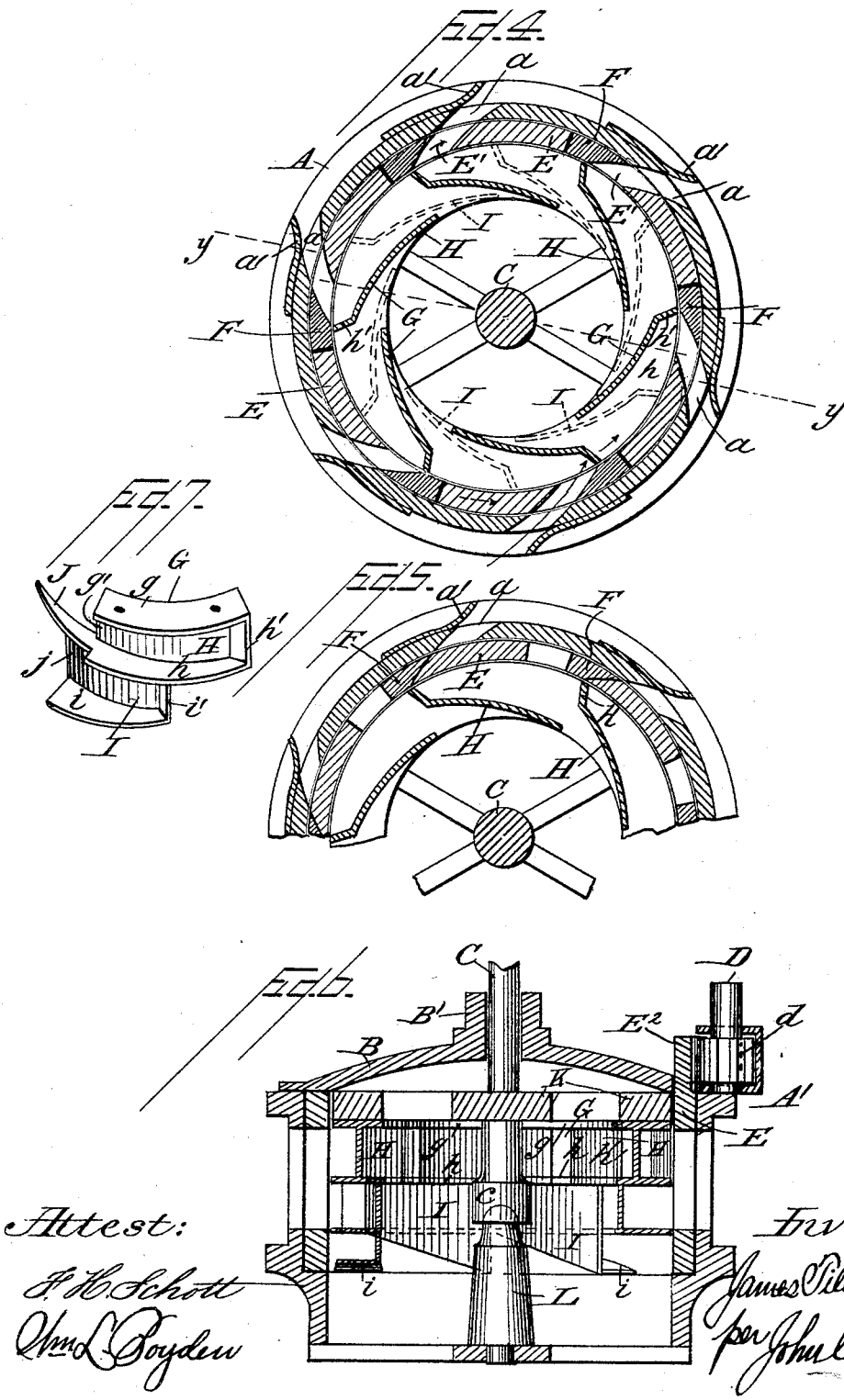

UNITED STATES PATENT OFFICE.

JAMES TILLIT CLAYTON, OF COLUMBUS, GEORGIA.

WATER-WHEEL.

SPECIFICATION forming part of Letters Patent No. 460,948, dated October 13, 1891.

Application filed March 28, 1891. Serial No. 386,726. (No model.)

*To all whom it may concern:*

Be it known that I, JAMES TILLIT CLAYTON, a citizen of the United States, residing at Columbus, in the county of Muscogee and State of Georgia, have invented certain new and useful Improvements in Water-Wheels; and I do hereby declare the following to be a full, clear, and exact description of the invention, such as will enable others skilled in the art to which it appertains to make and use the same.

My invention has reference to an improvement in water-wheels, its object being to simplify and perfect the construction of wheels of that class generally and commonly known as "turbine water-wheels;" and the invention therefore consists in the construction, arrangement, and combination of parts, substantially as will be hereinafter described and claimed.

In the annexed drawings, illustrating my invention, Figure 1 is a side elevation of my improved water-wheel. Fig. 2 is a top plan view of the same. Fig. 3 is a side elevation of the wheel proper removed from the casing which contains it. Fig. 4 is a horizontal section on the line $x\,x$ of Fig. 1, the apertures in the external casing being open to admit the water which impels the wheel located within said casing. Fig. 5 is a similar but partial section, showing the said apertures in the casing or wall closed to prevent the admission of the impelling-fluid. Fig. 6 is a vertical section on the line $y\,y$ of Fig. 4. Fig. 7 is a perspective view of one of the double buckets with which the water-wheel is provided.

Similar letters of reference designate corresponding parts throughout all the different figures of the drawings.

A designates the cylindrical casing, which contains the water-wheel proper. This casing may be of any suitable and desirable form and shape and of any convenient size. It is provided with a removable cover B, which carries a bearing B' for the vertical or upright shaft C, which passes downward into the interior of the casing A and is connected to the water-wheel, said upright shaft C being actuated by the rotary motion of the wheel.

The casing A is provided with a series of lateral openings $a$, having preferably-inclined parallel edges, as shown in the drawings, through which opening the impelling-fluid enters into the interior of the casing A for the purpose of impinging upon the wheel within. Alongside of each of the openings $a$ there is a projecting shoulder $a'$, secured to the outer surface of the casing A and acting to assist in directing the water or other impelling-fluid into each adjacent opening $a$ when the latter is opened.

Within the cylinder A is a concentric cylinder or barrel E, which is free to move through and partially rotate in one direction or the other, said concentric barrel being provided with a segment-gear $E^2$, which projects upward through a slot in the cover B and is engaged by a pinion $d$, within a boxing A' and on the lower end of a vertical shaft D, so that by the rotation of said vertical shaft D in any convenient manner, by mechanism applied above, the concentric barrel E may be rotated in one direction or the other, as may be desired, and thus caused to cover or uncover the series of lateral openings $a\,a$, to which we have just referred. The barrel or cylinder E is nothing but an annular rim having no heads and serving simply the purpose of a valve. The inner inside wall of the casing A is provided at points intermediate between the openings $a\,a$ with rigid plates or strips F F. (See Figs. 4 and 5.) Also the rotative valve-barrel E is provided with a series of openings of any suitable form, preferably rectangular, which openings receive the strips F, so that said strips serve as stops to limit the direction of movement of the barrel E in one direction or the other, and they also keep the barrel in place vertically.

E' E' designate the openings in the cylinder E. Obviously these openings are each of them partially occupied by the strips F. Said strips F are closely adjacent to the lateral openings $a$ in the casing A, and they are preferably inclined, as shown in Figs. 4 and 5, so that, as will be readily apparent, there is an inclined plane or surface provided, running from the inner faces of the strips F along out to the shield $a'$, and accordingly at each of the openings $a$ an inclined channel is formed through which the impelling-fluid enters to impinge upon the several buckets of the rotative wheel. It will be evident that by adjusting the barrel E therefore the openings E' can be caused to register or coincide substantially or in part with the lateral openings $a$, or the solid parts of the barrel E, between the openings E' E', may be caused to cover the lateral openings $a$, and therefore the openings $a$ can be opened or closed to permit or prevent the passage of fluid into the interior of the inside cylinder E.

Having thus described the surrounding casing, and the means of letting in or shutting off the supply of actuating-fluid, I will now proceed to describe the construction of the water-wheel proper, which is located within the said surrounding casing and likewise within the movable barrel E.

On the lower end of the shaft C is a horizontal plate or supporting-frame K, and projecting centrally below this plate K is a continuation of the shaft C in the form of a shaft $c$, having at its lower end a cup-bearing, which receives the upper rounded end of a stud L which is fixed rigidly in the foundation-beams of the water-wheel. Shaft $c$ revolves, therefore, upon the stud L. The horizontal frame or plate K carries a series of buckets. The buckets are of the form shown in Fig. 7. They are lettered G. They are preferably of a double construction. They are located opposite to the opening $a$ in the casing A, where they may be struck directly by the entering water. They are not cast integral with the plate K; but they are detachable and removably connected thereto, so that when one is broken it may be removed and another one substituted in lieu thereof. The buckets G consist of a horizontal plate $g$, which is fastened to the under side of the frame K. Integral with the plate $g$ is a vertical section H, below which is a horizontal plate $h$, having a curved and pointed extension J. At one end of the vertical section H is a connection $h'$ between the plates $g$ and $h$, so that the plates $g$ and $h$ H and $h'$ provide an open-sided receptacle, which is also open-ended at one end at $g'$, said receptacle being adapted to receive the water which impinges upon the wall H, which wall being curved as shown in Figs. 4 and 5, so that its end at the opening $g'$ will be at the rear edge of the plate $g$, will direct the water toward the center of the water-wheel and cause it to pass through the opening $g'$ into the inside part of the wheel, where it will fall downward and escape through the outlet. The bucket being double, as I have already stated, it will be seen from observation of Fig. 7 that the plate $h$ is made integral with another vertical wall I, which has at its lower edge a horizontal plate $i$, so that the plates $h$, I, and $i$, together with the end connection $i''$, form a second lower receptacle, having an open end at $j$, which receptacle is likewise adapted to receive the impelling-fluid, and the wall I being curved, said fluid will be directed around toward the opening $j$, where it will escape after acting on the bucket to produce a rotary motion of the water-wheel.

The end connection $i$ does not lie directly beneath the end projection $i'$, but instead is situated at a point about midway of the length of the plate $h$ and wall H, so that these two receptacles belonging to the same bucket are offset from each other. Although the curvatures of the walls H and I are somewhat similar, yet they take in different parts of the circle belonging to the water-wheel, so that, in fact, the impelling-fluid acts upon an entire circle of the wheel, inasmuch as the one end of the wall I is below the open space at the end $g'$ of the upper receptacle, so that although water is passing out through said opening at the end $g'$, it is acting upon the wall I directly beneath that point, and, on the other hand, when the water is passing out at the end $j$ of one of the lower receptacles of a bucket, the water is at the same time acting upon the opposite end of the wall H of the next adjoining bucket, so that the water is acting at all times upon the periphery of the wheel and impinging constantly either upon the upper or lower part of each bucket as they are successively brought under the action of the water. The lower plates $i$ preferably incline downward, as shown in Fig. 3. Between the plate $h$ and the curved pointed extension J of said plate is a shoulder, into which fits neatly the angular end of the adjoining bucket, so that the buckets can be fitted neatly in a circular series, thus gaining all the advantages which are commonly acquired by the use of a wheel having all its parts cast integral, and yet gaining the additional advantage of permitting any bucket which may be broken to be removed for the purpose of substituting a perfect one. All the parts of each bucket are cast integral with each other, so that each bucket is a unit.

The operation of my improved water-wheel will be readily understood from the foregoing description of the construction of the several parts. By manipulating shaft D the valve barrel or gate E can be opened or closed, so as to start or stop the wheel at the pleasure of the operator. In practical experience it is found that there is very little trouble in opening or closing a gate of this kind. It often happens that in case of high water sand and mud settle upon the wheel, so that it is almost impossible to open the gate. With my improved construction, however, there is such a small surface exposed to the action of the sand and mud that this difficulty cannot be encountered. Furthermore, it will be found that my improved construction of buckets enables me to obtain a greater power in the revolution of the wheel with a given quantity of fluid or power.

It will be obvious that many minor changes may be made in the construction and precise arrangement and form of the several parts of my improved water-wheel without departing from the invention, and I reserve the liberty therefore of making these changes as experience may dictate.

Having thus described my invention, what I claim as new, and desire to secure by Letters Patent, is—

1. In a water-wheel, the combination, with the wheel, of the cylindrical casing A, provided with a series of lateral openings $a$, alongside of each of which on the outside of the casing is a projecting shoulder $a'$, and said casing being provided on its inside wall at points intermediate between the openings $a$ with rigid plates or strips F, said strips F, openings $a$, and shoulders $a'$ being inclined, so as to afford inclined channels through which the impelling-fluid enters to impinge upon the wall, the interior concentric cylinder or barrel E, provided with a series of openings which receive the strips F, so that said strips serve as stops to limit the rotative movement of the barrel E, substantially as described.

2. In a water-wheel, the combination, with the water-wheel proper, of the cylindrical casing A, having a removable cover B, carrying a bearing B', the vertical shaft C, supported in said bearing and connected to the water-wheel, the said casing A having a series of openings $a$ and alongside of each thereof a projecting external shoulder $a'$, and also with the inside wall of said casing provided at points intermediate between openings $a$ with plates or strips F, the internal concentric barrel or cylinder E, provided with a series of openings E', that receive the strips F, so as to limit the direction of rotative movement of the barrel E, and the segment-gear $E^2$, with which the barrel E is provided, said gear being engaged by a pinion $d$ on a vertical shaft D, all arranged substantially as described.

3. In a water-wheel, the combination, with the external casing, of the shaft C, the horizontal plate or frame K, secured to said shaft, and the series of removable and detachable buckets connected to the plate K, said buckets consisting of a horizontal plate $g$, fastened to the under side of frame K, said plate G having integral therewith a vertical section H, below which is a horizontal plate $h$, having a curved and pointed extension J, there being at one end of the vertical section H a connection $h'$ between the plates $g$ and $h$, so that the aforesaid plates may provide an open-sided receptacle, which is opened at one end at $g'$, said plate $h$ being integral with another vertical wall I, having at its lower edge a horizontal plate $i$, so that the plates $h$, I, and $i$, together with the end connection $i'$, form a second lower receptacle having an open end at $j$, said end connection $i'$ being situated at a point about midway below the plate $h$ and wall H, so that the two receptacles belonging to the same bucket are offset from each other, all substantially as described.

In testimony whereof I affix my signature in presence of two witnesses.

JAMES TILLIT CLAYTON.

Witnesses:
 THOS. S. YOUNG,
 JOHN DUNCAN.